United States Patent
Kuehl et al.

(10) Patent No.: US 9,738,735 B1
(45) Date of Patent: Aug. 22, 2017

(54) PROCESS FOR ETHYLENE POLYMERIZATION WITH IMPROVED ETHYLENE FEED SYSTEM

(71) Applicant: Basell Polyolefine GmbH, Wesseling (DE)

(72) Inventors: Reinhard Kuehl, Bornheim (DE); Harald Prang, Erftstadt (DE); Rodrigo Carvajal, Bonn (DE); Elke Damm, Bad Vilbel (DE); Phil Pyman, Bad Soden (DE)

(73) Assignee: Basell Polyolefine GmbH, Wesseling (DE)

( * ) Notice: Subject to any disclaimer, the term of this patent is extended or adjusted under 35 U.S.C. 154(b) by 0 days.

(21) Appl. No.: 15/502,376

(22) PCT Filed: Aug. 6, 2015

(86) PCT No.: PCT/EP2015/068171
§ 371 (c)(1),
(2) Date: Feb. 7, 2017

(87) PCT Pub. No.: WO2016/020482
PCT Pub. Date: Feb. 11, 2016

(30) Foreign Application Priority Data

Aug. 7, 2014 (EP) .................... 14180180

(51) Int. Cl.
*C08F 10/02* (2006.01)
*C08F 2/14* (2006.01)
(Continued)

(52) U.S. Cl.
CPC ............. *C08F 10/02* (2013.01); *B01J 8/224* (2013.01); *B01J 2208/00902* (2013.01)

(58) Field of Classification Search
CPC ... C08F 2/14; C08F 10/02; B01J 8/224; B01J 2208/0902
(Continued)

(56) References Cited

U.S. PATENT DOCUMENTS 6,096,839 A 8/2000 Newton et al.
6,630,549 B1 10/2003 Koike
(Continued)

FOREIGN PATENT DOCUMENTS

EP 1336624 A1 8/2003
WO WO 97/18888 A1 5/1997

OTHER PUBLICATIONS

PCT International Search Report & Written Opinion mailed Nov. 11, 2015 for PCT/EP2015/068171.

*Primary Examiner* — Fred M Teskin

(57) ABSTRACT

The present disclosure relates to a process for the preparation of polyethylene by polymerizing in a slurry ethylene and optionally one or more $C_3$ to $C_{10}$ alpha-olefins. In some embodiments, the polymerization is carried out in a cylindrical polymerization reactor equipped with an agitator for mixing the contents of the reactor and inducing a flow of the slurry, the ethylene is fed into the reactor by an ethylene injection system comprising one or more injection nozzles which project through the bottom reactor head or through the reactor wall and extend from 0.02-0.5 times the inner diameter D into the reactor, and the ethylene exits the injection nozzle with an exit velocity from 10-200 m/s.

20 Claims, 5 Drawing Sheets

(51) Int. Cl.
*B01J 8/22* (2006.01)
*B01J 19/18* (2006.01)
(58) Field of Classification Search
USPC .......................................... 526/88; 422/135
See application file for complete search history.

(56) References Cited

U.S. PATENT DOCUMENTS 7,304,118 B2 * 12/2007 Lee .................. C08F 10/00
   525/240
7,781,547 B2 * 8/2010 Chen ................ C08F 10/10
   526/206

* cited by examiner the ethylene to form polyethylene particles. To prevent total plugging of the nozzle, the nozzle would have to be cleaned frequently.

Therefore, a continuing need exists for ethylene slurry polymerization processes having improved performance through more efficient ethylene dissolution and mixing, resulting in reduced internal reactor fouling.

PROCESS FOR ETHYLENE POLYMERIZATION WITH IMPROVED ETHYLENE FEED SYSTEM

This application is the U.S. National Phase of PCT International Application PCT/EP2015/068171, filed Aug. 6, 2015, claiming benefit of priority to European Patent Application No. 14180180.3, filed Aug. 7, 2014, the disclosures of which are incorporated herein by reference in their entirety.

FIELD OF THE INVENTION

The present disclosure relates to a process for ethylene polymerization. In some embodiments, the present disclosure relates to an ethylene slurry polymerization process having reduced fouling through an improved ethylene feed system.

BACKGROUND OF THE INVENTION

Various processes can be used to produce polyethylene, including gas phase processes, solution processes, and slurry processes. In ethylene slurry polymerization processes, diluents such as hexane or isobutane may be used to dissolve the ethylene monomer, comonomers and hydrogen, and the monomer(s) are polymerized with a catalyst. Following polymerization, the polymer product formed is present as a slurry of polyethylene particles suspended in the liquid medium.

In typical multi-reactor cascade processes, shown e.g., in WO 2005/077992 A1 and WO 2012/028591 A1, the reactors can be operated in parallel or in series, and the types and amounts of monomer and conditions can be varied in each reactor to produce a variety of polyethylene materials, including unimodal or multimodal polyethylene material. Such multimodal compositions are used in a variety of applications; e.g., WO 2012/069400 A1 discloses trimodal polyethylene compositions for blow moldings.

A potential challenge encountered using continuous stirred tank reactors in ethylene slurry polymerization systems is the fouling that can occur on the reactor internals. For instance, ethylene monomer is introduced into the reactor in gaseous form and dissolves in the diluent. The solid catalyst component is dosed into the reactor and is suspended in the diluent. When the dissolved ethylene comes into contact with the catalyst particles, polyethylene is formed. The reaction occurs throughout the reactor, including near the interior reactor surfaces and reactor internals, and the area around the ethylene inlet nozzles since the local concentration of ethylene is at its highest at the discharge of the inlet nozzle. The ethylene feed, in many such reactions, would immediately dissolve and be mixed so as to form a uniform concentration in the diluent in contact with uniformly distributed catalyst particles. However, if dissolution of the ethylene and mixing of the reactor contents is not adequate, solid polyethylene can deleteriously adhere to interior reactor surfaces and reactor internals. If such adhesion is ongoing, the accumulated material can form solid lumps and interfere with reactor performance. Ultimately, if not remedied, this process of fouling may lead to a unit shutdown for cleaning.

Conventional systems have fed the ethylene through a nozzle without a length of pipe in the bottom of the reactor. The ethylene entered the reactor directly at the reactor wall, which led to fouling around this nozzle due to the very high concentration of ethylene and in the suspension. Fouling also occurred inside the nozzle itself. Due to low velocities of ethylene at the exit of the nozzle, catalyst-containing suspension would migrate into the nozzle and react with

SUMMARY OF THE INVENTION

The present disclosure provides processes for ethylene slurry polymerization using an ethylene distribution system.

The disclosure provides processes for the preparation of polyethylene by polymerizing in a slurry ethylene and optionally one or more $C_3$ to $C_{10}$ alpha-olefins at a temperature from 60-95° C. and a pressure from 0.15-3 MPa, where the polymerization is carried out in a cylindrical polymerization reactor having a cylindrical reactor wall, a bottom reactor head and a top reactor head, where the reactor has an inner diameter D and is equipped with an agitator for mixing the contents of the reactor and inducing a flow of the slurry. In some embodiments, the ethylene is fed into the reactor by an ethylene injection system comprising one or more injection nozzles which project through the bottom reactor head or through the reactor wall and extend from 0.02-0.5 times the inner diameter D into the reactor and wherein the ethylene exits the injection nozzle with an exit velocity from 10-200 m/s.

In some embodiments, the injection nozzles projecting through the bottom reactor head or through the reactor wall have a direction into the reactor, a sloped ethylene outlet with an outlet tip and an outlet base, and an angle between the direction of the injection nozzle and the line connecting the outlet tip and the outer base of from 20-80°. In certain embodiments, the slope of the ethylene outlet is oriented in a way with respect to the flow of the slurry that the outlet tip is in an upstream position and the outlet base is in a downstream position with respect to the flow of the slurry.

In some embodiments, the agitator comprises a motor, a vertical rotating shaft, which may be centrally located in the reactor, and one or more stages of agitator blades attached to the rotating shaft; and wherein the agitator induces primarily a vertical flow of the slurry in a circular cross-section around the agitator shaft.

In some embodiments, the vertical flow of the slurry in the circular cross-section is a downward flow.

In some embodiments, the one or more injection nozzles project through the bottom reactor head and extend vertically from 0.04-0.2 times the inner diameter D into the reactor, and the horizontal distance from the center of the reactor to the outlet of the injection nozzles is from 0.1-0.45 times the inner diameter D.

In some embodiments, the ethylene injection system comprises at least two injection nozzles, and all injection nozzles are arranged on a circular line around the reactor center.

In some embodiments, the injection nozzles are uniformly distributed on the circular line.

In some embodiments, the one or more injection nozzles project through the cylindrical reactor wall at a wall passing point positioned in the lower two thirds of the reactor and extend from 0.02-0.48 times the inner diameter D into the reactor.

In some embodiments, the injection nozzles are inclined downward.

In some embodiments, the horizontal angle between the direction of the injection nozzle and the horizontal is of from 5-60°.

In some embodiments, the flow of the slurry in the polymerization reactor has a circular component, and the injection nozzles are inclined towards the downstream direction of the circular flow.

In some embodiments, the radial angle between the direction of the injection nozzle and a line running from the wall passing point to the center of the reactor is from 5-60°.

In some embodiments, the outlets of the injection nozzles are located at a position below the agitator.

In some embodiments, the wall passing points are arranged at the same height of the reactor and uniformly distributed around the reactor.

In some embodiments, the reactor is one of a multi-reactor polymerization system.

DETAILED DESCRIPTION OF THE INVENTION

Polyethylene Slurry Production Process

Figure 1:
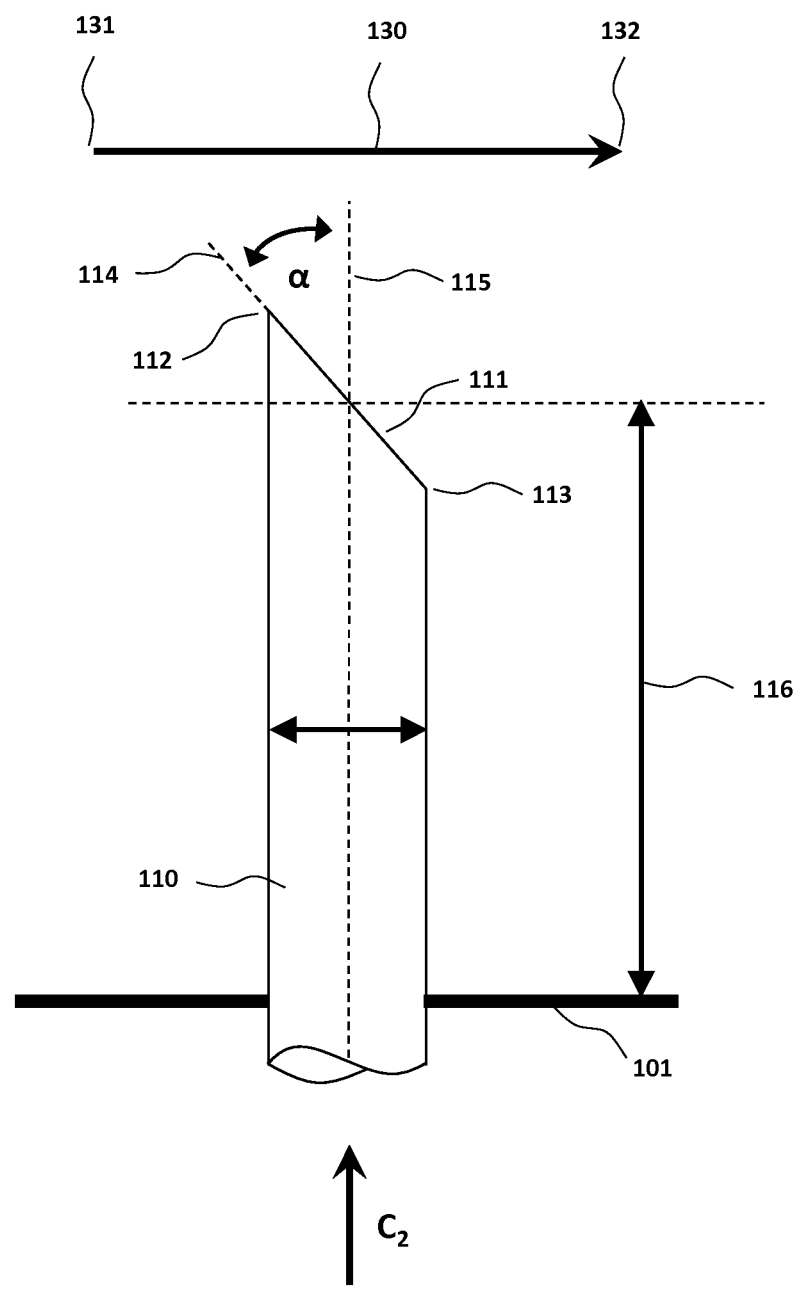
FIG. 1 depicts a side view of an ethylene feed injection nozzle.

In some embodiments, the process of the present disclosure for producing polyethylene includes the slurry polymerization of ethylene and optionally one or more $C_3$ to $C_{10}$ alpha-olefins as comonomers in the presence of an ethylene polymerization catalyst, a diluent, such as hexane or isobutane, and optionally hydrogen. The polymerization may proceed in a suspension of particulate polyethylene in a suspension medium comprising the diluent, unreacted ethylene and optionally one or more comonomers. Polyethylene polymers obtained by the process described in the present disclosure can be ethylene homopolymers or copolymers of ethylene containing up to 40 wt. %, and from 0.1 to 10 wt. % of recurring units derived from $C_3$-$C_{10}$-1-alkenes. The comonomers may be chosen from propylene, 1-butene, 1-pentene, 1-hexene, 1-octene and mixtures thereof. The slurry polymerization may occur at reactor temperatures from 60-95° C., from 65-90° C., and from 70-85° C., and at reactor pressures from 0.15-3 MPa, from 0.2-2 MPa, and from 0.25-1.5 MPa.

The polyethylene polymers produced by the polymerization process may be high density polyethylene (HDPE) resins having a density in a range from 0.935-0.970 g/cm³. Alternatively, the density is in a range from 0.940-0.970 g/cm³ and from 0.945-0.965 g/cm³. The density is measured according to DIN EN ISO 1183-1:2004, Method A (Immersion) with compression molded plaques of 2 mm thickness prepared with a defined thermal history: pressed at 180° C., 20 MPa for 8 min with subsequent crystallization in boiling water for 30 min.

The polyethylene polymers produced by the polymerization process may have a melt index ($MI_{21.6}$) from 1-300 dg/min, from 1.5-50 dg/min, or and from 2 dg/min to 35 dg/min. The $MI_{21.6}$ is measured according to DIN EN ISO 1133:2005, condition G at a temperature of 190° C. under a load of 21.6 kg.

Catalyst

The polymerization can be carried out using customary ethylene polymerization catalysts, e.g., the polymerization can be carried out using Phillips catalysts based on chromium oxide, using titanium-based Ziegler-type catalysts, i.e., Ziegler-catalysts or Ziegler-Natta-catalysts, or using single-site catalysts. For the purposes of the present disclosure, single-site catalysts are catalysts based on chemically uniform transition metal coordination compounds. The single-site catalysts may be those comprising bulky sigma- or pi-bonded organic ligands, e.g. catalysts based on mono-Cp complexes, catalysts based on bis-Cp complexes, which may be designated as metallocene catalysts, or catalysts based on late transition metal complexes, including iron-bis (imine) complexes. Furthermore, it is also possible to use mixtures of two or more of these catalysts for the polymerization of olefins. Such mixed catalysts are often designated as hybrid catalysts.

The catalysts may be of the Ziegler type and may comprise a compound of titanium or vanadium, a compound of magnesium and optionally a particulate inorganic oxide as a support.

The titanium compounds may be selected from the halides or alkoxides of trivalent or tetravalent titanium, with titanium alkoxy halogen compounds or mixtures of various titanium compounds. Examples of titanium compounds are $TiBr_3$, $TiBr_4$, $TiCl_3$, $TiCl_4$, $Ti(OCH_3)Cl_3$, $Ti(OC_2H_5)Cl_3$, $Ti(O\text{-}i\text{-}C_3H_7)Cl_3$, $Ti(O\text{-}n\text{-}C_4H_9)Cl_3$, $Ti(OC_2H_5)Br_3$, $Ti(O\text{-}n\text{-}C_4H_9)Br_3$, $Ti(OCH_3)_2Cl_2$, $Ti(OC_2H_5)_2Cl_2$, $Ti(O\text{-}n\text{-}C_4H_9)_2Cl_2$, $Ti(OC_2H_5)_2Br_2$, $Ti(OCH_3)_3Cl$, $Ti(OC_2H_5)_3Cl$, $Ti(O\text{-}n\text{-}C_4H_9)_3Cl$, $Ti(OC_2H_5)_3Br$, $Ti(OCH_3)_4$, $Ti(OC_2H_5)_4$ and $Ti(O\text{-}n\text{-}C_4H_9)_4$. In an embodiment of the preset disclosure, the titanium compounds may comprise chlorine as the halogen. In an embodiment, the titanium halides may comprise only halogen in addition to titanium or may be titanium chlorides or may be titanium tetrachloride. The vanadium compounds may be vanadium halides, vanadium oxyhalides, vanadium alkoxides or vanadium acetylacetonates. In an embodiment, the vanadium compounds are in the oxidation states 3 to 5.

In the production of the solid component, at least one compound of magnesium may be used. These compounds may be halogen-comprising magnesium compounds such as magnesium halides including chlorides or bromides, and magnesium compounds from which the magnesium halides can be obtained in a customary way, e.g., by reaction with halogenating agents. In an embodiment of the preset disclosure, the halogens are selected from chlorine, bromine, iodine and fluorine, as well as mixtures of two or more of these halogens.

Possible halogen-containing magnesium compounds are magnesium chlorides or magnesium bromides. Magnesium compounds from which the halides can be obtained are, for example, magnesium alkyls, magnesium aryls, magnesium alkoxy compounds, magnesium aryloxy compounds and Grignard compounds. The halogenating agents may be, for example, halogens, hydrogen halides, $SiCl_4$ and $CCl_4$. In an embodiment, chlorine or hydrogen chloride is the halogenating agent.

Examples of, halogen-free compounds of magnesium are diethylmagnesium, di-n-propylmagnesium, diisopropylmagnesium, di-n-butylmagnesium, di-sec-butylmagnesium, di-tert-butylmagnesium, diamylmagnesium, n-butylethylmagnesium, n-butyl-sec-butylmagnesium, n-butyloctylmagnesium, diphenylmagnesium, diethoxymagnesium, di-n-propyloxy magnesium, diisopropyloxymagnesium, di-n-butyloxymagnesium, di-sec-butyloxymagnesium, di-tert-butyloxymagnesium, diamyloxymagnesium, n-butyloxyethoxymagnesium, n-butyloxy-sec-butyloxymagnesium, n-butyloxyoctyloxymagnesium and diphenoxymagnesium.

Examples of Grignard compounds are methylmagnesium chloride, ethylmagnesium chloride, ethylmagnesium bromide, ethylmagnesium iodide, n-propylmagnesium chloride, n-propylmagnesium bromide, n-butylmagnesium chloride, n-butylmagnesium bromide, sec-butylmagnesium chloride, sec-butylmagnesium bromide, tert-butylmagnesium chloride, tert-butylmagnesium bromide, hexylmagnesium chloride, octylmagnesium chloride, amylmagnesium chloride, isoamylmagnesium chloride, phenylmagnesium chloride and phenylmagnesium bromide.

The magnesium compounds for producing the particulate solids may be, apart from magnesium dichloride and magnesium dibromide, the $di(C_1-C_{10}$-alkyl)magnesium compounds. In one embodiment, the Ziegler-type catalyst comprises a transition metal selected from titanium, zirconium, vanadium, and chromium.

The Ziegler-type catalyst may be added to the slurry reactor by first mixing the catalyst with the diluent, such as hexane, in a mixing tank to form a slurry which may be subsequently pumped. A positive displacement pump, such as a membrane pump may be used to transfer the catalyst slurry to the slurry polymerization reactor.

Catalysts of the Ziegler type may be used for polymerization in the presence of a cocatalyst. Accordingly, the slurry polymerization of the present disclosure may be carried out in the presence of a cocatalyst. In an embodiment, cocatalysts are organometallic compounds of metals of Groups 1, 2, 12, 13 or 14 of the Periodic Table of Elements, such as organometallic compounds of metals of Group 13 and organoaluminum compounds. The organoaluminum compounds may be selected from aluminum alkyls such as trialkylaluminum compounds, trimethylaluminum (TMA), triethylaluminum (TEAL), tri-isobutylaluminum (TIBAL), and tri-n-hexylaluminum (TNHAL). In an embodiment of the present disclosure, the aluminum alkyl is TEAL. The cocatalyst(s) may be miscible with the diluent and comprised in the suspension medium.

The cocatalyst can be added to the slurry reactor. In an embodiment, the cocatalyst is added by first mixing the cocatalyst with the diluent, such as hexane or isobutane, in a mixing tank. A positive displacement pump, such as a membrane pump may be used to transfer the cocatalyst to the slurry polymerization reactor.

The process of the present disclosure is carried out in at least one polymerization reactor. It may include a polymerization in a stand-alone polymerization reactor or it may include a polymerization in one polymerization reactor of a multi-reactor system. Such multi-reactor systems may be operated in parallel or in series. It is possible to operate two, three or more polymerization reactors in parallel. In an embodiment, the polymerization reactors of the multi-reactor system are operated in series; i.e. the reactors are arranged as a cascade. Such a series may include two or three reactors operating in series.

The process of the present disclosure is carried out in a cylindrical polymerization reactor which comprises a cylindrical reactor wall, a bottom reactor head connected to the cylindrical reactor wall at a bottom tangent and a top reactor head connected to the cylindrical reactor wall at a top tangent. The cylindrical polymerization reactor has an inner diameter D which corresponds to the inner diameter of the cylindrical reactor wall and a height H which is the distance from the bottom tangent to the top tangent measured along the central axis of the cylindrical polymerization reactor. The reactor may have a height/diameter ratio (H/D) of from 1.5-4 and a height/diameter ratio (H/D) of from 2.5-3.5.

The reactor is equipped with an agitator for mixing the contents of the reactor and inducing a flow of the slurry. In an embodiment of the present disclosure, the agitator is arranged centrally in the reactor and may comprise a motor located on the top reactor head, a rotating shaft extending along the reactor's central axis and one or more stages of agitator blades. There may be 2-6 stages of agitator blades attached to the rotating shaft including 4-5 stages of agitator blades. A stage of agitator blades may comprise several agitator blades such as 2-4 blades.

In an embodiment, the motor rotates the agitator shaft and the attached agitator blades. The rotation of the blades induces primarily a vertical flow of the slurry in a circular cross-section around the agitator shaft. This vertical flow of the slurry may be a downward flow. At the bottom head, this flow changes direction, and flows first outward toward the reactor wall and then back upward to the top, changes direction again and then back to the center of the polymerization reactor. The rotation of the agitator also results in a secondary flow pattern of slurry in the reactor. This secondary flow is a circular flow in the direction of rotation of the agitator. To control this circular flow, the polymerization reactor may be equipped with one or more baffles.

According to the process of the present disclosure, the ethylene is fed into the polymerization reactor by an ethylene injection system comprising one or more injection nozzles, which project through the bottom reactor head or through the reactor wall and extend from 0.02-0.5 times the inner diameter D into the reactor. The length by which the injection nozzles extend into the reactor is the distance from the point where the injection nozzle center line exits the injection nozzle at its ethylene outlet to the point where the injection nozzle center line passes the inner surface of the reactor wall or the inner surface of the bottom reactor head.

The ethylene is provided to the injection nozzles from the outside of the reactor, passes the reactor wall at the wall passing points of the injection nozzles and exits the injection nozzles through the outlets of the injection nozzles arranged within the polymerization reactors. The injection nozzles may be straight pipes of an inner diameter $D_N$ and have a defined direction into the reactor. The direction of the injection nozzles corresponds to the direction of the injection nozzle center lines. According to the present disclosure, the ethylene is fed to the reactor with an ethylene exit velocity of from 10-200 m/s, including from 25-150 m/s. The desired ethylene exit velocity is achieved by designing diameter $D_N$ of the one or more injection nozzles in an appropriate way so that the targeted ethylene flow rate to the slurry polymerization results in the desired ethylene exit velocity. The relatively high exit velocity provides high differential speed with respect to the circulating reactor contents, and higher turbulence, which provides improved mixing.

In an embodiment of the present disclosure, the end of the injection nozzle as arranged within the polymerization reactor, i.e. the ethylene outlet of the injection nozzle, is sloped and has an outlet tip and an outlet base. The slope may be arranged such that the angle between the direction of the injection nozzle and the line connecting the outlet tip and the outlet base, i.e. the angle between the injection nozzle center line and the line connecting the outlet tip and the outlet base, is from about 20-80°, including from about 30° to 60°. The slope of the ethylene outlet may be oriented in such a way with respect to the flow of the slurry that the outlet tip is in an upstream position and the outlet base is in a downstream position with respect to the flow of the slurry. Orientation of the nozzle in this manner minimizes migration of slurry into the nozzle to reduce or prevent fouling. For injection nozzles having a sloped ethylene outlet, the point where the injection nozzle center line exits the injection nozzle is the point where the center line meets the line connecting the outlet tip and the outlet base.

FIG. 1 illustrates an embodiment of an injection nozzle of the present disclosure. Injection nozzle 110 projects through reactor wall 101, which can be either the wall of the reactor bottom head or the cylindrical side wall of the reactor, and has an outlet 111 which has an outlet tip 112 and an outlet base 113. Angle α is the angle between line 114 connecting outlet tip 112 and outlet base 113 and center line 115 of injection nozzle 110. Angle α may be from 20-80°. Distance 116 is the extension of injection nozzle 110 into the polymerization reactor.

For injection nozzle 110 shown in FIG. 1, ethylene is provided from below and exits the injection nozzle through outlet 111. The slurry flows in direction 130 corresponding to a flow from an upstream point 131 to a downstream point 132. According to the embodiment shown in FIG. 1, the slope of the ethylene outlet 111 as defined by line 114 is oriented in a way with respect to the flow of the slurry that the outlet tip 112 is in an upstream position and the outlet base 113 is in a downstream position with respect to direction 130 of the flow of slurry.

In an embodiment of the present disclosure, the one or more injection nozzles project through the bottom reactor head. In this embodiment the injection nozzles extend vertically from 0.04-0.2 times the inner diameter D into the reactor, including from 0.07-0.15 times the inner diameter D into the reactor, and the horizontal distance from the center of the reactor to the outlet of the injection nozzles is from 0.1-0.45 times the inner diameter D, or from 0.2-0.4 times the inner diameter D. Consequently, the outlets of the injection nozzles are located below the agitator at positions where the downward flow of the slurry induced by the agitator has changed direction and flows primarily outward towards the reactor wall. Accordingly, the outlets of sloped injection nozzles are oriented in a way that the outlet tips are positioned in the direction of the reactor center and the outlet bases are positioned in the direction of the reactor walls. When the ethylene injection system comprises two or more injection nozzles, all injection nozzles may be arranged on a circular line around the reactor center. The injection nozzles may be uniformly distributed on the circular line and have uniform spacing, so that with two nozzles there is 180 degrees of spacing between the nozzles; when there are three nozzles, there is 120 degrees of spacing between the nozzles; and when there are four nozzles, there is 90 degrees of spacing between the nozzles.

Figure 2:
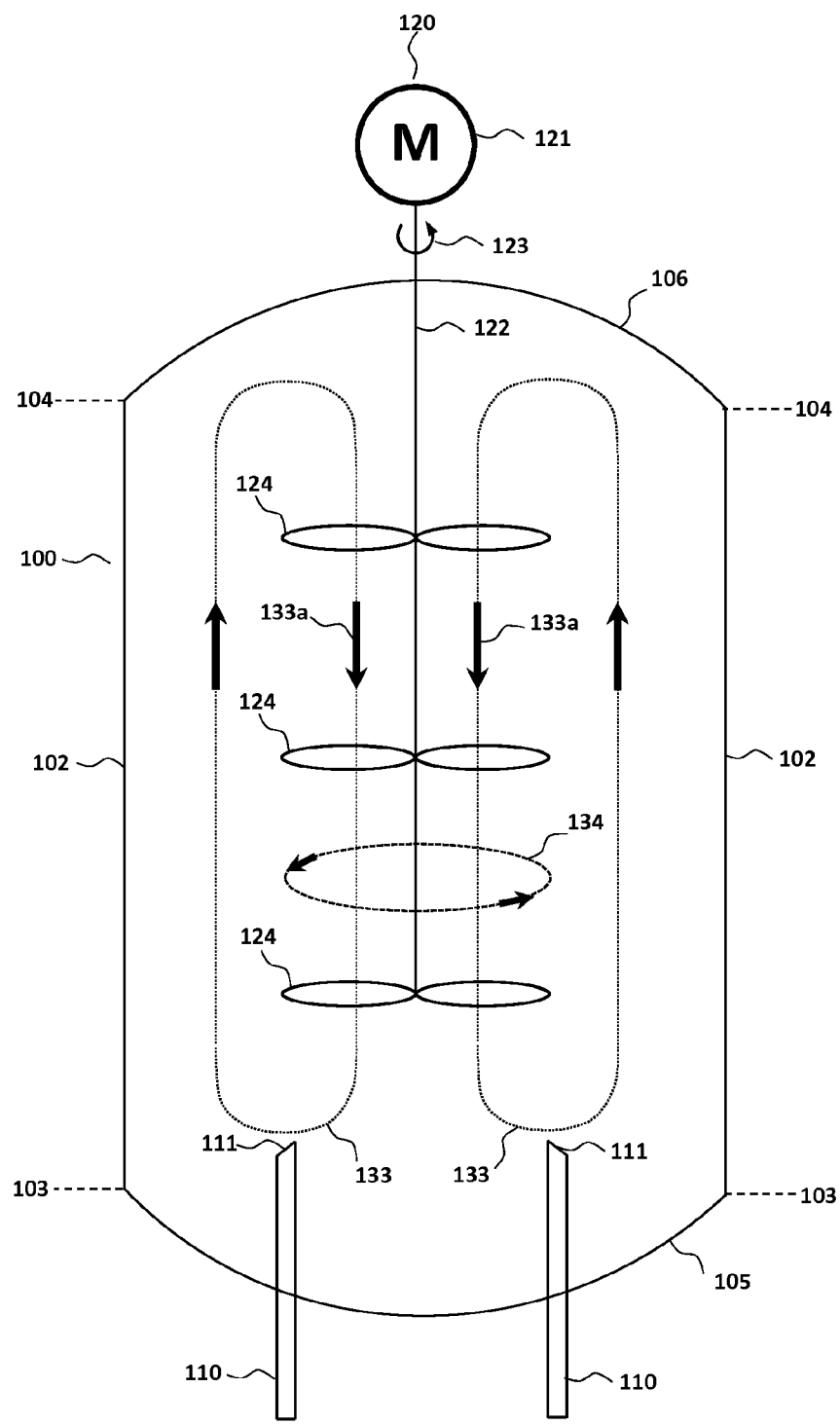
FIG. 2 depicts a side view of an ethylene slurry polymerization reactor with a bottom feed ethylene injection system.
Figure 3:
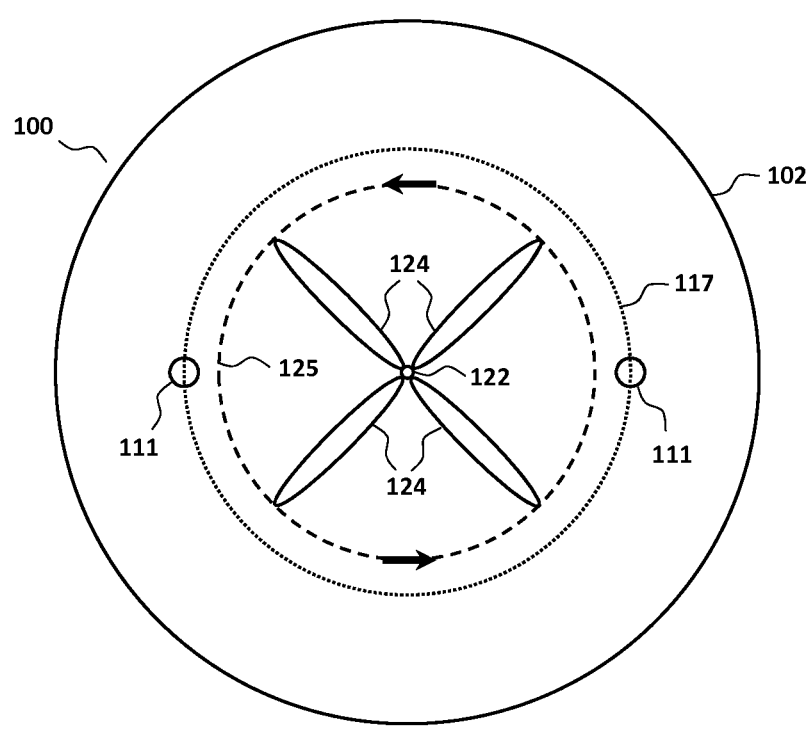
FIG. 3 depicts a top view of an ethylene slurry polymerization reactor with a bottom feed ethylene injection system.

FIGS. 2 and 3 illustrate an embodiment in which two injection nozzles project through the bottom reactor head.

Reactor 100, as shown in FIG. 2, includes a cylindrical reactor wall 102 that extends from a bottom tangent 103 to a top tangent 104; a bottom reactor head 105 connected to the cylindrical reactor wall 102 at the bottom tangent 103; a top reactor head 106 connected to the cylindrical reactor wall 104 at the top tangent 104; and an agitator 120 for mixing the contents of the reactor 100. The agitator 120 has a motor 121, a rotating shaft 122 which is centrally located in the reactor 100, extending along the reactor's central axis and is driven by motor 121 in a direction of rotation 123, and three stages of agitator blades 124 attached to the rotating shaft 122. The reactor has a height, H, measured along its central axis from the bottom tangent 103 to the top tangent 104, and an inner diameter D.

The blades of agitator stages 124 convey the contents of the reactor 100 in a primary flow pattern 133 with a flow vector 133a initially oriented downward along the central axis of the reactor 100 to the bottom head 105, where it changes direction and flows first outward toward the reactor wall 102 and then back upward to the top head 106, changes direction again and then back to the impeller(s) 103. The rotation of the blades of stages 124 also result in a secondary flow pattern 134 in the reactor. The secondary flow 134 is a circular motion in the direction of rotation 123 of the rotating shaft 122.

The reactor 100 also contains an ethylene injection system for feeding ethylene into the reactor 100. An embodiment shown in FIG. 2 has two injection nozzles 110 that project inward through the bottom reactor head 105. The injection nozzles 110 have sloped ethylene outlets 111 which are oriented in a way that the outlet tips are positioned in a direction toward the reactor center and the outlet bases are positioned in a direction toward the reactor wall. In some embodiments, the diameter of injection nozzles 110 is adapted to maintain an ethylene exit velocity from 10-200 m/s.

FIG. 3 is a top view of reactor 100 shown in FIG. 2. The depicted agitator stage 124 has four agitator blades attached to rotating shaft 122. The rotation of the agitator blades of stages 124 defines a circular cross-section 125. The two ethylene outlets 111 of the two injection nozzles used in the embodiment shown in FIG. 3 have the same distance from the center of the reactor and thus also from rotating shaft 122 and are accordingly positioned on circle 117.

In another embodiment of the present disclosure, the one or more injection nozzles project through the cylindrical reactor wall. In this embodiment, the injection nozzles extend from 0.02-0.48 times the inner diameter D into the reactor, such as from 0.1-0.4 times the inner diameter D into the reactor, and the injection nozzles project through the wall at a wall passing point positioned in the lower two third of the reactor; i.e., a point with a distance of not more than H*2/3 from the bottom tangent which connects the cylindrical reactor wall and the bottom tangent. In some embodiments, the wall passing point, at which the injection nozzles projects through the cylindrical reactor wall, is positioned at a point in the lower half of the reactor, i.e. at a point with a distance of not more than H/2 from the bottom tangent, alternatively the wall passing point is positioned in the lower third of the reactor, i.e., a point with a distance of not more than H/3 from the bottom tangent.

The injection nozzles projecting through the cylindrical reactor wall may incline downward. For inclining injection nozzles, the horizontal angle between the direction of the injection nozzle and the horizontal, i.e. the angle between the center line of the injection nozzle and the horizontal, ma be from 5-60°, from 7.5-45°, and from 10-30°. The injection nozzles projecting through the cylindrical reactor wall may also have a radial deviation such that the center line of the injection nozzles is not passing through the reactor center. This deviation may be towards the downstream direction of the circular flow of the slurry which can be induced as a secondary flow pattern by the rotation of the agitator.

Injection nozzles not directed to the reactor center may have a radial angle between the direction of the injection nozzle, i.e. the center line of the injection nozzle, and a line running from the wall passing point to the center of the reactor, of from 5-60°, from 7.5-45°, and from 10-30°. The outlets of the injection nozzles may be arranged at a height which differs from the height of a stage of agitator blades attached to the agitator shaft. The outlets of the injection nozzles may be arranged below at least one stage of the agitator blades, and the outlets of the injection nozzles may be located at a position below the agitator, i.e. below all stages of the agitator blades. Consequently, the outlets of the injection nozzles may be located at positions where the primary flow pattern is a downward flow of the slurry with an additional, smaller, circular flow. Accordingly, the outlets of sloped injection nozzles may be arranged in a way that the outlet tip is in upstream position with respect to the primary flow pattern.

The injection nozzles projecting through the cylindrical reactor wall may be positioned in a way that all wall-passing points are arranged at the same height of the reactor. In an embodiment, the injection nozzles are uniformly distributed around the reactor and have uniform spacing, so that with two nozzles there is a 180 degree spacing between the nozzles; when there are three nozzles, there is a 120 degree spacing between the nozzles; and when there are four nozzles, there is a 90 degree spacing between the nozzles. Orienting the nozzles in this way prevents solids from entering the nozzles if solids settle in the reactor, as well as maximizing the number of nozzles that can be installed relative to an installation on the bottom of the reactor. Higher numbers of nozzles provide even more improved mixing and distribution of the ethylene.

Figure 4:
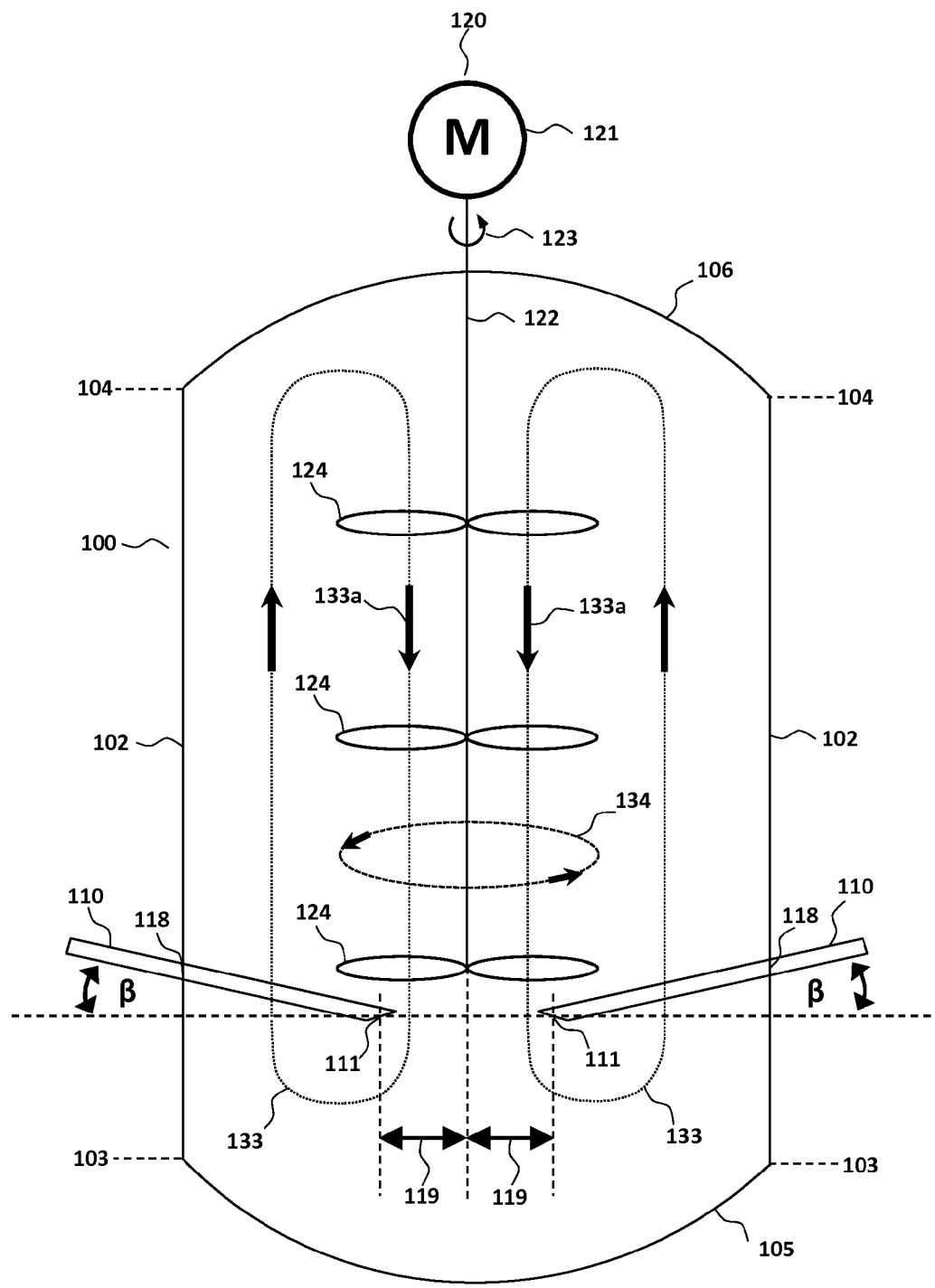
FIG. 4 depicts a side view of an ethylene slurry polymerization reactor with a side feed ethylene injection system.
Figure 5:
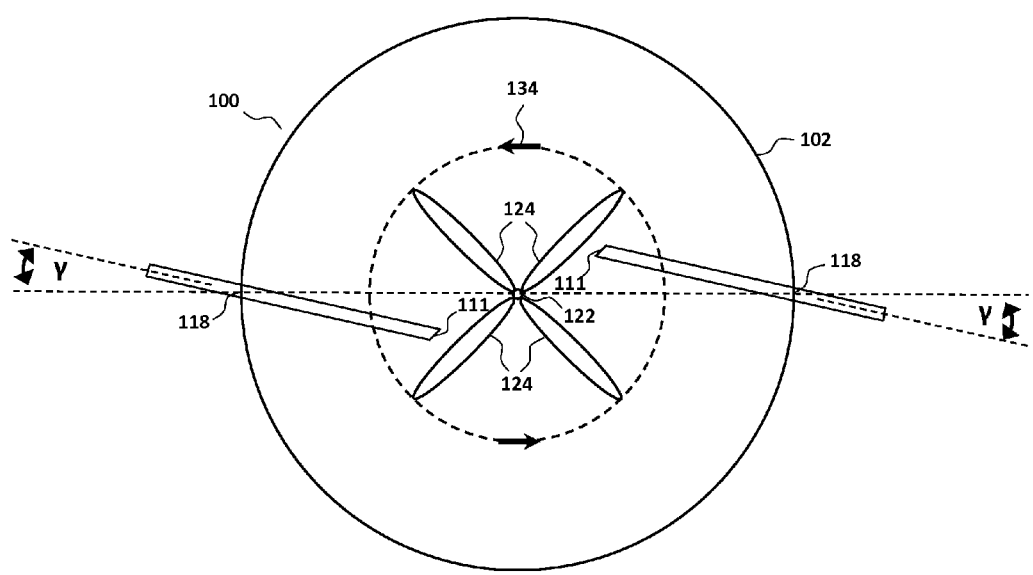
FIG. 5 depicts a top view of an ethylene slurry polymerization reactor with a side feed ethylene injection system.

FIGS. 4 and 5 illustrate an embodiment in which two injection nozzles project through the cylindrical reactor wall. The reactor shown in FIGS. 4 and 5 is identical to that depicted in FIGS. 2 and 3 and is agitated in the same manner.

The ethylene injection system for feeding ethylene into the reactor 100 shown in FIG. 4 has two injection nozzles 110 that project inward through the cylindrical reactor wall 102 at wall passing points 118 positioned at the same height in the lower third of the reactor. The injection nozzles 110 may incline downward with a horizontal angle β between the center lines 115 and the horizontal 135. When injection nozzles 110 incline downward, angle β may be from about 5-60°. The ethylene outlets 111 of the injection nozzles 110 are located at a position below the agitator 120, i.e. below all stages of agitator blades 124. Distances 119 are the horizontal distances of the outlets of the injection nozzles to the center of the reactor. The injection nozzles 110 have sloped ethylene outlets 111 which are oriented in a way that the outlet tips are positioned in an upward position corresponding to the primarily downward flow in the circular cross-section defined by the rotation of the agitator blades. The diameter of injection nozzles 110 is adapted to maintain an ethylene exit velocity from about 10-200 m/s.

FIG. 5 is a top view of reactor 100 shown in FIG. 4. The two injection nozzles 110 may have a tangential deviation towards the downstream direction of the circular flow of the slurry 134 for which the tangential deviation has a radial angle γ between the center lines 115 of the injection nozzle 110 and a line 136 running from the wall passing point 118 to the center of the reactor thus to rotating shaft 122. When injection nozzles 110 have a tangential deviation, angle γ may be from 5-60°.

While multiple embodiments are disclosed, still other embodiments will become apparent to those skilled in the art from the following detailed description. As will be apparent, certain embodiments, as disclosed herein, are capable of modifications in various obvious aspects, all without departing from the spirit and scope of the claims as presented herein. Accordingly, the drawings and detailed description are to be regarded as illustrative in nature and not restrictive.

We claim:

1. A process for the preparation of polyethylene by polymerizing in a slurry ethylene and optionally one or more $C_3$ to $C_{10}$ alpha-olefins at a temperature from 60-95° C. and a pressure from 0.15-3 MPa; wherein the polymerization is carried out in a cylindrical polymerization reactor having a cylindrical reactor wall, a bottom reactor head and a top reactor head and the reactor has an inner diameter D and is equipped with an agitator for mixing the contents of the reactor and inducing a flow of the slurry; wherein the ethylene is fed into the reactor by an ethylene injection system comprising one or more injection nozzles which project through the bottom reactor head or through the reactor wall and extend from 0.02-0.5 times the inner diameter D into the reactor and wherein the ethylene exits the injection nozzle with an exit velocity from 10-200 m/s.

2. The process of claim 1, wherein the injection nozzles projecting through the bottom reactor head or through the reactor wall have a direction into the reactor, a sloped ethylene outlet with an outlet tip and an outlet base, and an angle between the direction of the injection nozzle and the line connecting the outlet tip and the outer base of from 20-80°, and the slope of the ethylene outlet is oriented with respect to the flow of the slurry such that the outlet tip is in an upstream position and the outlet base is in a downstream position with respect to the flow of the slurry.

3. The process of claim 1, wherein the agitator comprises a motor, a vertical rotating shaft centrally located in the reactor, and one or more stages of agitator blades attached to the rotating shaft; and wherein the agitator induces primarily a vertical flow of the slurry in a circular cross-section around the agitator shaft.

4. The process of claim 3, wherein the vertical flow of the slurry in the circular cross-section is a downward flow.

5. The process of claim 1, wherein the one or more injection nozzles project through the bottom reactor head and extend vertically from 0.04-0.2 times the inner diameter D into the reactor, and the horizontal distance from the center of the reactor to the outlet of the injection nozzles is from 0.1-0.45 times the inner diameter D.

6. The process of claim 5, wherein the ethylene injection system comprises at least two injection nozzles, and all injection nozzles are arranged on a circular line around the reactor center.

7. The process of claim 6, wherein the injection nozzles are uniformly distributed on the circular line.

8. The process of claim 1, wherein the one or more injection nozzles project through the cylindrical reactor wall at a wall passing point positioned in the lower two thirds of the reactor, and extend from 0.02-0.48 times the inner diameter D into the reactor.

9. The process of claim 8, wherein the injection nozzles are inclined downward.

10. The process of claim 9, wherein the horizontal angle between the direction of the injection nozzle and the horizontal is of from 5-60°.

11. The process of claim 8, wherein the flow of the slurry in the polymerization reactor has a circular component, and the injection nozzles are inclined towards the downstream direction of the circular flow.

12. The process of claim 11, wherein the radial angle between the direction of the injection nozzle and a line running from the wall passing point to the center of the reactor is from 5-60°.

13. The process of claim 8, wherein the outlets of the injection nozzles are located at a position below the agitator.

14. The process of claim 8, wherein the wall passing points are arranged at the same height of the reactor and uniformly distributed around the reactor.

15. The process of claim 1, wherein the reactor is in a multi-reactor polymerization system.

16. A process for the preparation of polyethylene by polymerizing in a slurry ethylene and optionally one or more $C_3$ to $C_{10}$ alpha-olefins at a temperature from 60-95° C. and a pressure from 0.15-3 MPa; wherein the polymerization is carried out in a cylindrical polymerization reactor having a cylindrical reactor wall, a bottom reactor head and a top reactor head, the reactor has an inner diameter D and is equipped with an agitator for mixing the contents of the reactor and inducing a flow of the slurry; wherein the ethylene is fed into the reactor by an ethylene injection system comprising one or more injection nozzles which project through the cylindrical reactor wall at a wall passing point positioned in the lower two thirds of the reactor and extend from 0.02-0.48 times the inner diameter D into the reactor; and wherein the ethylene exits the injection nozzle with an exit velocity from 10-200 m/s.

17. The process of claim 16, wherein the injection nozzles are inclined downward and the horizontal angle between the direction of the injection nozzle and the horizontal is from 5-60°.

18. The process of claim 16, wherein the flow of the slurry in the polymerization reactor has a circular component, the injection nozzles are inclined towards the downstream direction of the circular flow, and the radial angle between the direction of the injection nozzle and a line running from the wall passing point to the center of the reactor is from 5-60°.

19. The process of claim 17, wherein the outlets of the injection nozzles are located at a position below the agitator.

20. A process for the preparation of polyethylene by polymerizing in a slurry ethylene and optionally one or more $C_3$ to $C_{10}$ alpha-olefins at a temperature from 60-95° C. and a pressure from 0.15-3 MPa; wherein the polymerization is carried out in a multi-reactor system comprising a cylindrical polymerization reactor having a cylindrical reactor wall, a bottom reactor head and a top reactor head, wherein the reactor has an inner diameter D and is equipped with an agitator for mixing the contents of the reactor and inducing a flow of the slurry; wherein the ethylene is fed into the reactor by an ethylene injection system comprising one or more injection nozzles which project through the bottom reactor head or through the reactor wall and extend from 0.02-0.5 times the inner diameter D into the reactor and wherein the ethylene exits the injection nozzle with an exit velocity from 10-200 m/s.

* * * * *

UNITED STATES PATENT AND TRADEMARK OFFICE
CERTIFICATE OF CORRECTION

PATENT NO. : 9,738,735 B1
APPLICATION NO. : 15/502376
DATED : August 22, 2017
INVENTOR(S) : Reinhard Kuehl et al.

It is certified that error appears in the above-identified patent and that said Letters Patent is hereby corrected as shown below:

On the Title Page

Column 1, (87) Line 1        After "2016", insert --¶(65) Prior Publication Data
                             US 2017/0233505 A1 Aug. 17, 2017--

In the Specification

Column 5     Line 4      Delete "di-n-propyloxy magnesium," and insert
                         --di-n-propyloxymagnesium,--
Column 7     Line 67     Delete "104" and insert --102--
Column 9     Line 62     Delete "136" and insert --114--

In the Claims

Column 10    Line 22     In Claim 1, after "reactor", insert --;--
Column 12    Line 25     In Claim 20, after "reactor", insert --;--

Signed and Sealed this
Third Day of March, 2020

Andrei Iancu
*Director of the United States Patent and Trademark Office*